3,067,107
PROPIONIC ACID FERMENTATION
Morris Wayman, Mervin E. Martin, and George Graf, all of Prince Rupert, British Columbia, Canada, assignors to Columbia Cellulose Company Ltd., Prince Rupert, British Columbia, Canada, a company incorporated of British Columbia, Canada
Filed May 11, 1959, Ser. No. 812,381
6 Claims. (Cl. 195—28)

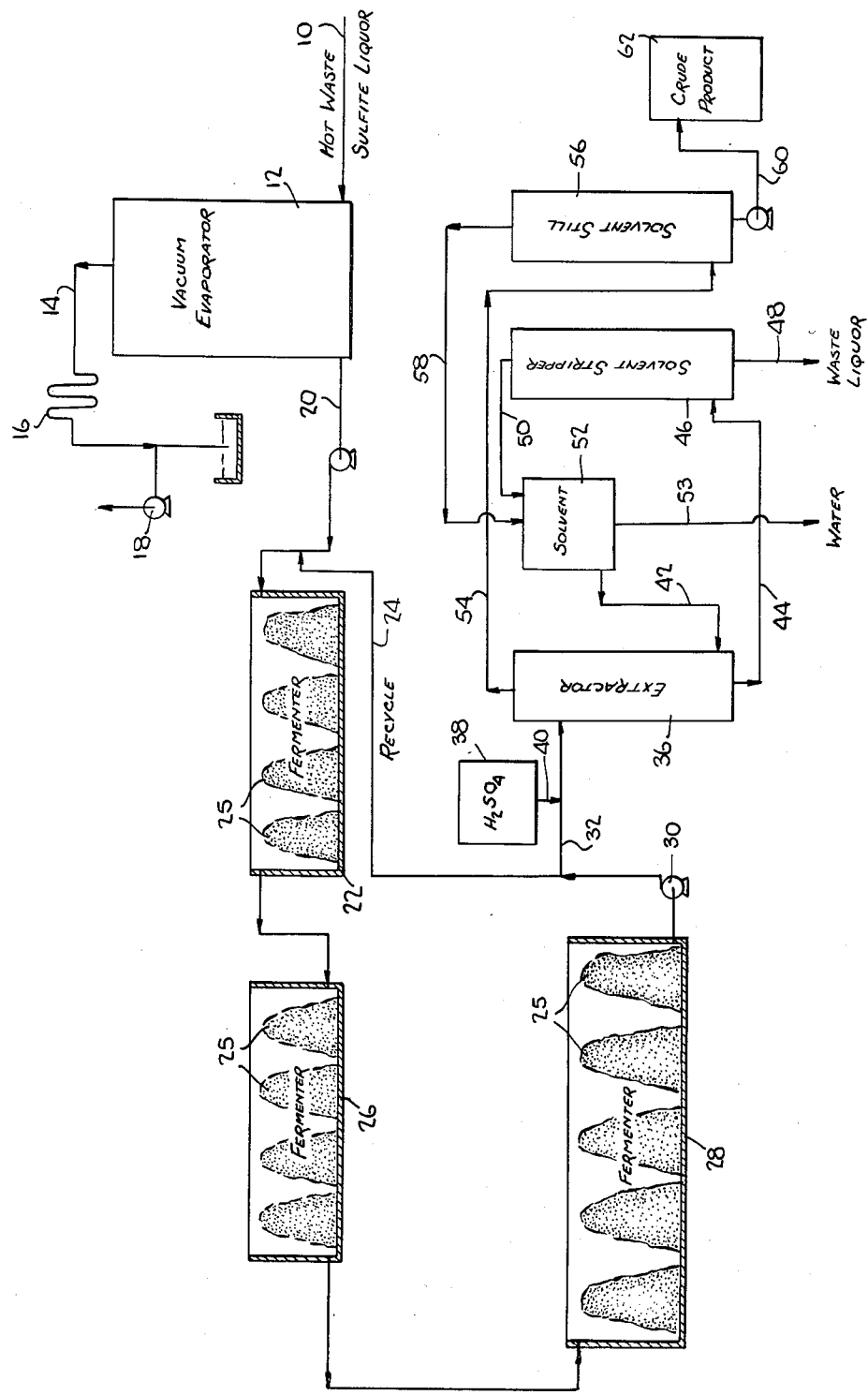

This invention relates to the fermentation of wood pulp waste liquor, and relates more particularly to the fermentation of wood pulp waste liquor with bacteria of the genus Propionibacterium.

At the present time the major portion of the waste liquor produced by the wood pulp industry is discarded, as in the case of sulfite waste liquor, or burned to recover the inorganic materials therein, as in the case of sulfate waste liquor. This practice is highly uneconomic, since there is a complete loss of the organic materials contained in the waste liquor. In addition, when the waste liquor is discarded, a considerable expense is often involved in treating the waste liquor to prevent water pollution.

It is an important object of this invention to avoid this loss and to provide a process for converting a portion of the organic materials present in wood pulp waste liquor into commercially valuable products.

A further object of this invention is the provision of a process for the fermentation of wood pulp waste liquor with bacteria of the genus Propionibacterium.

A further object of the invention is to provide a process for the continuous fermentation of wood pulp waste liquor to produce propionic acid in high yields in minimum fermentation time.

A further object of the invention is to provide a process for the continuous fermentation of wood pulp waste liquor with a simple automatic control of pH at the optimum level.

A further object of the invention is to provide a process for continuous fermentation of wood pulp waste liquor which does not require the addition of growth substances.

Other objects of this invention will be apparent from the following detailed description and claims. In the following detailed description and claims all proportions are by weight unless otherwise indicated.

In accordance with one aspect of this invention sulfite waste liquor is fermented by passing it through at least one zone containing bacteria of the genus Propionibacterium. Part of the fermented liquor is then recycled to said zone together with fresh feed of the sulfite waste liquor. In preparing the fresh feed it is desirable to remove the free and loosely combined sulfur dioxide contained therein, which may be done conveniently by boiling, preferably under vacuum, and preferably with simultaneous aeration. However even after such treatment the fresh feed is still too acidic for efficient fermentation, which is preferably carried out under less acid or substantially neutral conditions.

When this acidic feed stock is blended with the recirculated liquor the blend is perfectly satisfactory for passage through the fermentation zones without further treatment. We have found that the recycled liquor has a buffering action, which greatly simplifies the problem of control of pH to the value which is optimum for the bacteria. In addition the recycling of liquor has been found to inhibit the growth of mold in the fermentation zone; this may be due, at least in part, to the presence of propionates, such as calcium propionate in the recycled liquor.

Other advantages are attributable to the recirculation feature, notably improved yields of propionic acid. Apparently the material resulting from the fermentation includes substances which act as a stimulant and catalyst for the conversion of the sugars to propionate. This catalytic action shortens the required fermentation time. The recirculated portion of the feed stock provides a steady supply of non-volatile intermediate fermentation products (e.g. lactates) for renewed exposure to fermentation.

According to another aspect of this invention, the fermentation of the sulfite waste liquor is effected by passing it through lump limestone on the surfaces of which are colonies of bacteria of the genus Propionibacterium. By lump limestone is intended a particle size distribution which will not be suspended and carried away in the flowing waste liquor. By and large, broken limestone ⅛" or larger will satisfactorily serve as the lump limestone employed in fermentation according to the practice of the instant invention. The lump limestone can be employed as packing in fermentation towers or, as preferred, be simply piled up inside large horizontal fermentation tanks. It is convenient to arrange the limestone in piles which restrict the flow of fermenting waste liquor, giving increased contact with the liquor as it flows through the spaces between the rock, and to add further piles of limestone as the limestone is consumed.

Primarily the limestone serves as an alkalizing and buffering agent. One problem which has always faced this art has been how to maintain optimum pH conditions during fermentation despite the continuous acid production. pH values lower than optimum (e.g. pH below 5.7) reduce conversion rate of the sugars appreciably. Batchwise addition of an alkaline neutralizing agent has a retarding affect on the fermentation. Controlled regulation of pH by metering a liquid stream of alkaline material is complicated, expensive, and results in local destruction of bacteria. Attempts to provide the unfermented liquor with the necessary caustic prior to fermentation resulted in lowered yield of the desired volatile acids, propionic and acetic acids. Employment of lump limestone avoids these difficulties by simultaneously alkalizing and buffering the waste liquor to within the preferred pH range for fermentation. In this buffering action it is assisted by the organic acids present in the feed stock due to the recycle of part of the fermented liquor.

As a secondary advantage, it has been found that the lump limestone provides a satisfactory substratum for bacterial colonies, thereby avoiding need for stirring to suspend the bacteria in the waste sulfite liquor or for an inert substratum. Moreover, the limestone appears also to provide trace elements such as silicon, aluminum, iron, magnesium, etc. needed for efficient bacterial action. Thus employment of limestone also eliminates the need for adding trace elements to the fermenting waste sulfite liquor.

In practice the fermentation tanks or towers always contain a large excess of lump limestone over the chemical consumption requirements for the fermentation liquor so as to provide the desired substratum and buffering features. Since limestone is always being consumed, makeup limestone can be intermittently added to maintain always a large quantity of lump limestone in the system.

In the practice of the process of the present invention it has been found unnecessary to add growth substance for the bacteria to the sulfite liquor being continuously processed. Advantageously the procses is started by growing the bacteria in a suitable nutrient medium containing known growth substance and nitrogen sources, until a large population (e.g. of a concentration of about 3 to $3.5 \times 10^8$ bacteria per cc.) is obtained. This may then be passed through the limestone beds to massively inoculate the beds with the bacteria, after which sulfite waste liquor substantially free of said bacteria and substantially free of added growth substances is passed continuously through said beds.

Growth factor and nitrogen sources for the bacteria of the genus Propionibacterium are well known. Examples of suitable growth factors, containing the vitamin B, riboflavin, amino acids and the like ordinarily required by the Propionibacterium are, for example, yeast extract, tryptone, malt sprouts and barley sprouts. Suitable nitrogen sources are, for example, urea, ammonium sulfate, and dibasic ammonium phosphate.

Some, or all, of these may be added continuously to the sulfite waste liquor before its passage through the fermentation zones, if desired and readily available. However, by maintaining a large population of bacteria in the fermenting sulfite waste liquor, increase in numbers of bacteria becomes hindered, the bacteria exert their main metabolic processes for fermentation and not growth, and the use of growth factor becomes unnecessary.

During fermentation, the temperature of the sulfite waste liquor is maintained in the range of about 20 to 40° C., best results being obtained at temperatures in the range of about 35 to 38° C. When a series of beds is used the temperature in each bed may be maintained at a different level from that in other beds; for example the first bed may be held at about 38° C., the temperature gradually falling in the other beds.

The raw sulfite waste liquor generally contains about 1.8 to 2.5% of sugars, typical analysis of the latter being about 50% dextrose, 15% mannose, 8% galactose and 27% of the pentoses, xylose and arabinose. Before fermentation, the hot sulfite waste liquor drained from wood pulp upon completion of digestion must be cooled to fermentation temperatures. Desirably, the free and loosely combined sulfur dioxide present therein is stripped by a reduced pressure flash-off which serves also to lower the temperature of the waste liquor. Steam distillation may be employed concomitantly to lower sulfur dioxide content further, and to concentrate the waste sulfite liquor.

Up to about 50% of the water in the sulfite waste liquor may be removed prior to fermentation, increasing the total solids content of the waste liquor to about 20% by weight. The removal of the water also increases the sugar content of the waste liquor correspondingly and reduces the required fermentation vat volume by up to about 50%. It has been found that this increased concentration of solids in the sulfite waste liquor does not have an unfavorable effect upon either the speed of fermentation or the yield of the dseired products, whereas sulfite waste liquor concentrated to 30% by weight total solids will not ferment. Advantageously, the removal of the water and sulfur dioxide from the sulfite waste liquor may be effected simultaneously during the steam-stripping or flashoff referred to above.

The pH of the raw sulfite waste liquor, before removal of the sulfur dioxide, is usually in the range of about 1.0 to 1.5. Removal of sulfur dioxide raises the pH to the range of about 1.5 to 3.0. The pH of the liquor leaving the fermentation zones is generally in the range of about 5.7 to 6.2, and the proportion of recirculated liquor to fresh feed is usually such as to produce a blend having a pH in the range of about 4 to 6 preferably about 4 to 5, which blend is fed to the fermentation zones. The ratio of recirculated liquor to fresh feed may be, for example, in the range of about 0.5:1 to 2:1, the ratio of about 1:1 being particularly satisfactory.

Other species of Propionibacterium other than *arabinosum* may be used, for example, *shermanii*.

Following the completion of fermentation, the propionic and other acids may be recovered from the waste liquor in any desired manner. For example, the fermented waste liquor is acidified with sulfuric or other strong mineral acid to liberate the propionic and other organic acids produced during the fermentation, following which the fermented waste liquor may be filtered or otherwise treated to remove the bacteria of the genus Propionibacterium therefrom. The propionic and other acids may then be recovered by steam distillation. However, it is preferred to recover the propionic and other acids by solvent extraction employing the solvent mixture disclosed in U.S. Patent 2,572,128.

In practice it has been found that recovery of volatile acids from the fermented waste liquor has required less acidification per pound of recovered organic acid than by prior art practices. Without being bound thereto it is theorized that the reduction in non-volatile acid products of fermentation attributable to the recirculation feature and the buffering action attributable to the presence of lump limestone both contribute to this desirable result.

If desired, other related solvent mixtures like ethylacetate-benzene may be employed to extract the fermented waste liquor.

For further understanding of this invention, reference is made to the drawing wherein there is illustrated a preferred arrangement of apparatus for effecting the fermentation process of the instant invention.

As shown in the drawing, hot waste sulfite liquor directly from the pulp mill is fed through line 10 to a vacuum evaporator 12 where the waste liquor is cooled to fermentation temperatures. The vapors exiting through line 14 are condensed and collected by suitable condenser structure 16, while vacuum pump 18 removes non-condensables and applies the desired vacuum on evaporator 12. The condensate can be discarded or recycled back to the mill, as desired. The cooled waste sulfite liquor is pumped from evaporator 12 through line 20 to the first fermentation tank 22. Recycled fermented liquor from line 24 is added to the fresh waste sulfite liquor as a combined feed stock to the fermentation. Multiple fermentation tanks 22, 26, 28 are provided, the liquor flowing serially through the tanks. Lump limestone is disposed in piles 25 inside each fermentation tank.

At the outlet from the last fermentation tank, a pump 30 forces part of the fermented liquor through recycle line 24 and the balance through feed line 32 to extraction tower 36. If desired, a filter (not shown) may be disposed across line 32 ahead of the extraction tower 36. Prior to entering extraction tower 36 the fermented liquor is acidified with sulfuric acid from suitable storage vessel 38 and line 40.

Inside extraction tower 36 the acidified fermented liquor is contacted with a solvent mixture which enters near the bottom from line 42 and passes counter-current to the liquor, extracting therefrom the organic acids. The stripped liquor removed from the bottom of extraction tower 36 is passed by way of line 44 to a solvent stripping column 46 where the solvent is steam stripped from the extracted liquor. The residual waste sulfite liquor removed through line 48 may be discarded or treated to recover the lignin or inorganic chemicals therein as desired. The solvent vapors which pass overhead of stripping column 46 through line 50, are condensed and recycled to solvent storage tank 52. Water which carries over with the solvent vapors as an azeotrope is decanted off and discarded through line 53.

The solvent (and extracted material) pass from the top of extraction tower 36 through line 54 to acid recovery column or still 56 where, by distillation, the solvent is recovered. In this column the solvent is recovered as the still overhead through line 58, and recycled to solvent storage tank 52. The crude organic acid bottoms product is passed through line 50 to a suitable product storage vessel 62. An additional distillation column (not shown) can be provided to separate out pure propionic acid.

The following examples are given to illustrate the practice of this invention further.

Example I

Sulfite waste liquor to be fermented (originally of pH 1.0–1.5) is pretreated by 50–60 minutes boiling with slight aeration (stripping the material of free sulfurous acid). After treatment the waste sulfite liquor exhibits a pH 1.5–3.0. Sulfite waste liquors from two separate cooks are used, one containing originally 1.8% (cook A), and the other 2.5% (cook B) fermentable sugar content before pretreatment.

The inoculum employed for the fermentation is prepared from a culture of Propionibacterium arabinosum (American Type Culture Collection No. 4965). The agar stab culture is transferred first to a liquid medium of 2% glucose, 2% yeast extract, 2% calcium carbonate precipitate in tap water. During a two to three week interval it is transoculated several times in a medium of the same composition. In the last step this glucose culture is inoculated to a sulfite waste liquor basal medium (cook A, 1.8% sugar) containing added thereto, 1% ether extract of yeast extract, 0.5% dibasic ammonium phosphate, 0.5% urea, 1.5% $CaCO_3$ precipitate and 10 p.p.m. each of cobalt, manganese, magnesium and ferrous ions. In a week the bacteria population attains a concentration of $3.0-3.5 \times 10^8$ per cubic centimeter. (This level is kept and even surpassed during the later fermentation of the waste sulfite liquors in the packed tubes.)

Employing the culture so prepared, the pretreated waste sulfite liquor is fermented during serial passage upward through five vertical glass tubes of equal size, each 5 feet high. The first four tubes are packed with lump limestone sized between $\frac{1}{4}''-\frac{1}{8}''$. The last tube is there to sediment the bacteria if some are carried along with the flow. The limestone tubes are surrounded by water jackets to control their temperatures at 38, 37, 36, and 35° respectively. The last tube is kept at room temperature (25° C.).

The limestone is a commercial product which analyzes 43.5–43.8 percent loss on ignition, 99.4–99.7% calcium carbonate and 0.6–0.3 percent acid insoluble material. It contains trace quantities of Si, Al, Mn, Fe and larger amounts of Mg.

Fermentation is effected according to the following procedures.

(a) Once-through operation with neutralized waste sulfite liquor for 5 days, the rate of flow being such that the retention time of the liquor in the series of limestone tubes is 65–70 hours (the retention time being determined by dividing the capacity of the limestone filled vessels by the rate of flow of fresh feed).

(b) Almost total recycle where nearly all of the fermented output was recycled, adding but small percentages (about $\frac{1}{10}$ of the amount recycled) of fresh makeup liquor to the storage vessel, using pretreated cook A liquor.

(c) Recycle operation with half of the fermenter output recycled, the rate of flow being such that the retention time, calculated as above, is 54 hours.

The almost total recycle condition (b) is continued for 5 days, after which the recycle is gradually decreased and the rate of flow of liquor through the limestone gradually increased over a period of a day to reach condition (c) described above.

In operation the output is at pH 5.7–6.2, and the blend of fresh feed and recycle and liquor has a pH of 4.5, the degree of conversion of the carbohydrates is 84%. A mixture of volatile acids (propionic and acetic acids) is produced, the mole ratio of propionic to acetic being 2:1.

Example II

In an apparatus constructed according to the mode illustrated in the drawing, 1,000 gallons per minute of hot waste sulfite liquor directly from a pulp mill is passed through a vacuum evaporator where the liquor is steam stripped and cooled. This reduces the volume to 850 g.p.m. The pH of the treated liquor is about pH 1.7. An additional 850 g.p.m. of fermented liquor is combined with the fresh waste sulfite liquor, and the 1700 g.p.m. of feed stock at pH 4.5 passed serially through two concrete tanks 20′ x 40′ x 100′, then a tank 20′ x 40′ x 200′. Several piles of broken limestone are present in each fermentation tank, make-up limestone being added intermittently at the rate of 43 tons per day.

Fermentation temperature is controlled to 38–35° C. by immersion heaters, the first tank being 38° C. and the second 35° C. Residence time of the waste sulfite liquor (calculated as in Example I) is 54 hours. The initial inoculum is a culture of Propionibacterium arabinosum prepared as in the previous example.

850 g.p.m. of the fermented liquor is recycled, and the balance acidified to pH 1.0 with concentrated sulfuric acid (66° Bé.), then extracted with 850 g.p.m. of a 70:30 ethyl acetate-benzene mixture, to a recover a mixture of propionic and acetic acids, amounting to about 120,000 pounds per day.

It is to be understood that the foregoing detailed description is merely given by way of illustration and that many variations may be made therein without departing from the spirit of our invention.

The embodiments of the invention in which an exclusive property or privilege is claimed are defined as follows:

1. In a process for the production of propionic acid from sulfite waste liquor the steps which comprise: evaporating the hot sulfite waste liquor to remove sulfur dioxide therefrom until a pH of about 1.5 to 3.0 is reached; admixing the resulting fresh sulfite waste liquor with about 50 to 200 percent thereof of recycled fermented liquor to bring the pH of the combined liquor to within the range of about 4 to 6; and flowing the combined liquor continuously through a series of fermentation zones containing lump limestone having pieces at least $\frac{1}{8}''$ in size, the surfaces of which contain colonies of bacteria of the genus Propionibacterium, a portion of the fermented liquor being recycled for admixture with fresh sulfite waste liquor.

2. Process as set forth in claim 1 in which the sulfite waste liquor supplied is substantially free of added nutrients for said bacteria.

3. Process as set forth in claim 1 in which said fermentation zone contains lump limestone on the surfaces of which are colonies of bacteria of the genus Propionibacterium.

4. Process as set forth in claim 1 in which the fermentation temperature is about 35–38° C.

5. Process as set forth in claim 1 in which Propionibacterium arabinosum is employed.

6. Process as set forth in claim 1 in which Propionibacterium shermanii is employed.

References Cited in the file of this patent

UNITED STATES PATENTS

| | | |
|---|---|---|
| 1,875,688 | Christensen | Sept. 6, 1932 |
| 1,913,346 | Stiles | June 6, 1933 |
| 1,937,672 | Sherman | Dec. 5, 1933 |
| 2,020,251 | Stiles | Nov. 5, 1935 |
| 2,430,355 | McCarthy | Nov. 4, 1947 |
| 2,689,817 | Fortess et al. | Sept. 21, 1954 |